United States Patent [19]

Schierling

[11] Patent Number: 4,542,813
[45] Date of Patent: Sep. 24, 1985

[54] FRICTIONAL CLUTCH ASSEMBLY

[75] Inventor: Bernhard Schierling, Kürnach, Fed. Rep. of Germany

[73] Assignee: Fichtel & Sachs AG, Schweinfurt, Fed. Rep. of Germany

[21] Appl. No.: 485,655

[22] Filed: Apr. 18, 1983

[30] Foreign Application Priority Data

Apr. 29, 1982 [DE] Fed. Rep. of Germany ....... 3215886

[51] Int. Cl.⁴ .............................................. F16D 13/50
[52] U.S. Cl. ................................ 192/70.27; 192/89 B
[58] Field of Search ......................... 192/70.27, 89 B; 267/161, 162, 163

[56] References Cited

U.S. PATENT DOCUMENTS

| 2,126,149 | 8/1938 | Spase | 192/70.27 |
| 2,169,787 | 8/1939 | Becker | 192/70.27 |
| 2,256,714 | 9/1941 | Hunt | 192/70.27 |
| 2,952,453 | 9/1960 | Häussermann | 192/89 B |
| 4,126,216 | 11/1978 | Babcock et al. | 267/161 |

FOREIGN PATENT DOCUMENTS

| 2230951 | 12/1972 | Fed. Rep. of Germany | 267/161 |
| 1065928 | 4/1967 | United Kingdom . | |
| 1083226 | 9/1967 | United Kingdom . | |
| 1221761 | 2/1971 | United Kingdom . | |
| 1412530 | 11/1975 | United Kingdom . | |
| 2080447 | 2/1982 | United Kingdom . | |

Primary Examiner—Rodney H. Bonck
Assistant Examiner—Alan G. Towner
Attorney, Agent, or Firm—Toren, McGeady, Stanger, Goldberg & Kiel

[57] ABSTRACT

In a frictional clutch assembly a diaphragm spring is supported by the clutch housing and engages a pressure plate such as to urge the pressure plate towards a driving member and effect frictional engagement of a clutch disc between the pressure plate and the driving member. The diaphragm spring is provided with radially extending slots extending from the radially inward edge of the diaphragm spring in radial outward direction. Tongues are provided between subsequent slots. The tongues are engaged by a clutch release unit for lifting the diaphragm spring from the pressure plate in view of disengagement operation of the clutch assembly. In view of reducing the length of the necessary clutch disengagement path of the radially inner ends of the tongues to be effected by the clutch release unit alternating tongues are deflected in opposite axial directions and a spacer assembly is provided between a first group of tongues deflected in a first axial direction and a second group of tongues deflected in a second axial direction.

9 Claims, 8 Drawing Figures

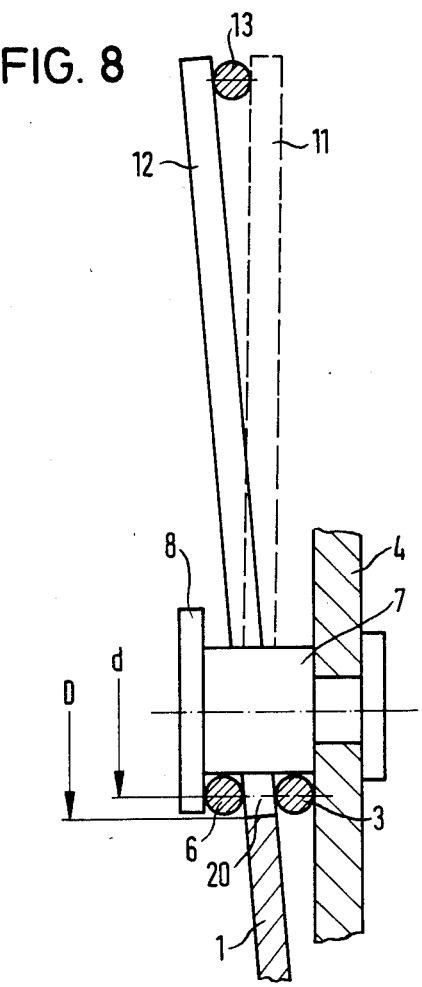

FRICTIONAL CLUTCH ASSEMBLY

SUMMARY OF THE INVENTION

The present invention is directed to a clutch assembly particularly for motor vehicles and to be used as a torque transmitting group between an internal combustion engine and a gear box. Such a frictional clutch assembly comprises a driving member rotatable about an axis and having a driving member engagement face. A clutch housing is fixed to the driving member for common rotation therewith. A pressure plate is located axially between the driving member engagement face and the clutch housing. The pressure plate is fixed for common rotation with the clutch housing and is axially movable with respect to the driving member. The pressure plate includes a pressure plate engagement face opposite to the driving member engagement face. A clutch disc unit is provided between the driving member and the pressure plate. This clutch disc unit has a first counter engagement face for axially engaging the driving member engagement face and a second counter engagement face for axially engaging the pressure plate engagement face.

An annular diaphragm spring is provided for urging the pressure plate towards the driving member in view of effecting frictional engagement of the clutch disc unit with the driving member and the pressure plate. This annular diaphragm spring has a radially outer edge, a radially inner edge and an annular support area about the axis. The diaphragm spring is supported along said annular support area by the clutch housing. Further, the diaphragm spring is provided with an annular pressure plate engagement area, along which the diaphragm spring acts upon the pressure plate for urging the pressure plate towards the driving member engagement face. Further, the diaphragm spring comprises an annular release unit engagement area about the axis. In this annular release unit engagement area the diaphragm spring can be engaged by a release unit in view of lifting the annular pressure plate engagement area from the pressure plate. The release unit engagement area is adjacent the radially inner edge of the annular diaphragm spring. The diaphragm spring is provided with radially extending slots extending radially outward from the radially inner edge of the diaphragm spring. Radially inwardly extending tongues are defined between subsequent slots.

Such a frictional clutch assembly is well known in the art.

With the known frictional clutch assemblies a relatively long path of movement is to be effected at the radially inner ends of the tongues in view of sufficiently lifting the annular pressure plate engagement area from the pressure plate in view of complete disengagement of the frictional clutch assembly. This is due to the weakness of the radially inwardly extending tongues in axial direction, which makes it necessary in clutch disengagement operation to deflect the radial inner ends of the tongues to a considerable degree before a force can be transmitted from the clutch release unit to the diaphragm spring which is sufficient to lift the annular pressure plate engagement area of the diaphragm spring from the pressure plate.

It is a primary object of this invention to reduce the length of the path of movement of the radially inner ends of the tongues, which is necessary in view of obtaining a sufficient lifting of the annular pressure plate engagement area of the diaphragm spring from the pressure plate in view of obtaining complete disengagement of the frictional clutch assembly.

A further object of this invention is to provide a frictional clutch assembly which is both simple in design, economic in manufacturing and highly reliable in operation.

In view of at least one of these objects a first group of tongues is deflected relative to a second group of tongues at least adjacent their respective radially inner ends and an annular spacer assembly is positioned axially between said first group of tongues and said second group of tongues.

It has surprisingly been found that due to the spacer assembly located between the radially inner ends of the different groups of tongues, these tongues are stiffened to such an extent that the path of movement of the radially inner ends of the tongues, which is necessary in view of obtaining sufficient lifting of the pressure plate engagement area from the pressure plate, is considerably reduced. A reduction of this necessary path of movement for considerably more than one-half of the necessary path of movement in known assemblies has been obtained. It will be readily understood that such a reduction of the necessary length of the path of movement of the radially inner ends of the tongues corresponding to the necessary path of movement of the clutch release unit is of high constructional advantage in designing drive units for motor vehicles in view of reduction of the overall space requirements. The reduction of the necessary path of movement of the clutch unit allows also a reduced path of movement at the operator's pedal or, if the path of movement on the operator's pedal is maintained unchanged due to corresponding variation of the transmission ratio to reduce the necessary force to be exterted by the operator's foot onto the pedal.

It is known from European Patent Publication No. 23,790 to deflect a first group of tongues with respect to a second group of tongues. However, in this known device no spacer means are provided between the first group of tongues and the second group of tongues, and the aim of this known relative deflection is to obtain a smooth engagement of the frictional clutch assembly without axially acting spring means being provided in the clutch disc unit.

Further features of this invention can be seen from the subclaims which form a part of the disclosure.

By the constructional feature of FIG. 2 one obtains in a most economic way a fixation of the annular spacer assembly in radial direction.

The stiffening effect can be varied by the radial positioning of the annular spacer means, or in other words by variation of the diameter of the annular spacer assembly. A high degree of stiffening is obtained by positioning the annular spacer assembly adjacent the release unit engagement area.

The stiffening of the tongues can be further increased by providing additional spacer ring means radially outwardly of first spacer ring means.

The annular spacer assembly may comprise one or more spacer rings or, a plurality of spacer segments. If spacer rings are provided, these spacer rings may be open-end rings.

According to a preferred embodiment of the invention alternating tongues are positioned on different sides of the spacer assembly; or in other words: respective tongues of the first group of tongues are located between two respective tongues of the second group and respective tongues of the second group are located between two respective tongues of the first group.

In view of further improving the radial positioning of the spacer assembly the tongues may be provided with centering faces.

In view of reliable operation it may further be helpful to fix the spacer assembly in peripheral direction with respect to the tongues. Such fixation in peripheral direction may be obtained, e.g. by providing the open ends of a spacer ring member or a spacer half-ring member with limbs engaging in respective slots.

In view of reducing high local stress concentration at the spacer assembly and the faces of the tongues engaging the spacer assembly, the tongues may have—when regarded in radial direction—a cross-sectional configuration such as to engage the spacer assembly with a convex assembly engagement face. A further reduction of such local stress concentration and a reduction in axial space requirements may be obtained when said spacer assembly is wave-shaped along its circumference and the tongues engage respective valleys of the wave shape.

The basic principles of this invention are applicable to both pressed-type clutch assemblies and pulled-type frictional clutch assemblies, both of them being well known in the art. In pressed-type frictional clutch assemblies the annular support area is located radially between the annular pressure plate engagement area and the annular release unit engagement area. The diaphragm spring is supported along the annular support area by first support means on one axial side of the diaphragm spring and second support means on the other side of the diaphragm spring. In such a construction according to a further feature of this invention, the slots can extend radially beyond the annular suport area and the tongues can be deflected to such an extent as to maintain said one and said other side of said diaphragm spring into engagement with the first and second support means. So a lost motion between the diaphragm spring and the clutch housing can be avoided by the deflection of the tongues, even if after assembling of the clutch housing and the diaphragm spring and before the positioning of the spacer assembly such a lost motion was still existing.

The invention will be explained in greater detail below by reference to some examples of embodiment.

BRIEF DESCRIPTION OF THE DRAWING

FIG. 8 shows in an enlarged representation the supporting area of the diaphragm spring with the respective portion of the clutch housing and the support means.

DETAIL DESCRIPTION OF THE DRAWING

Figure 1:
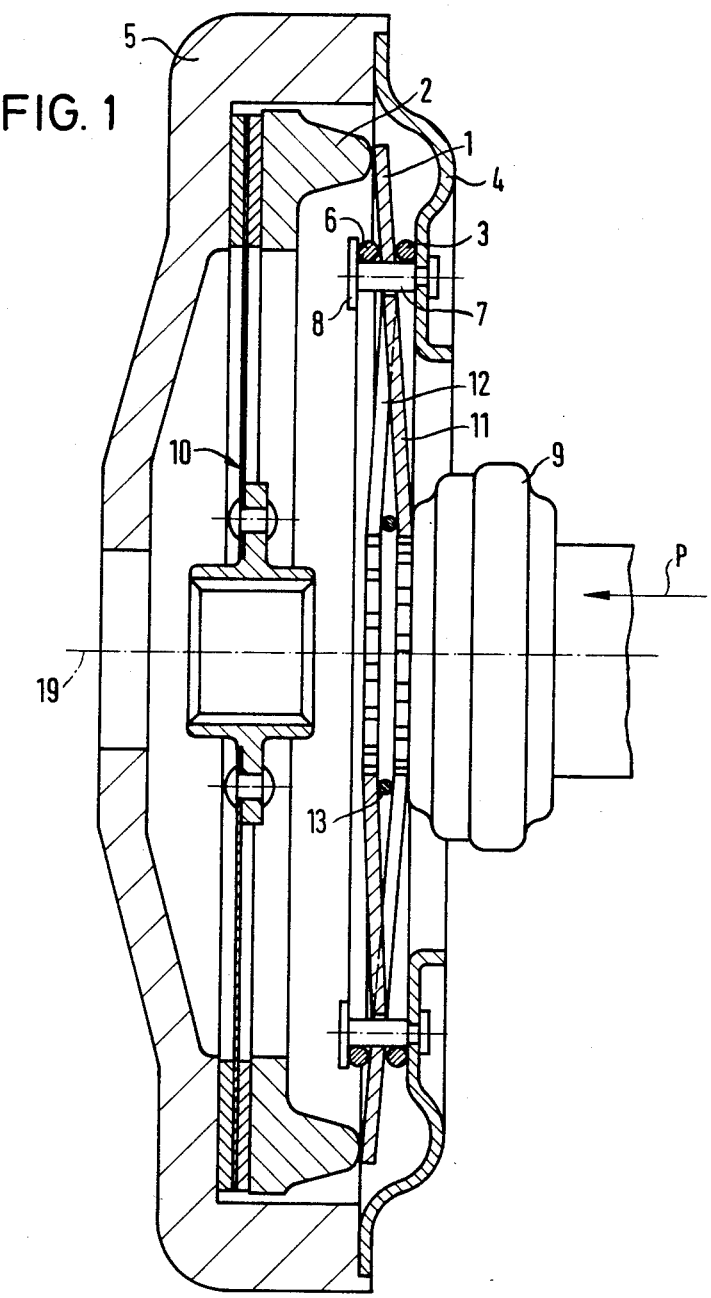
FIG. 1 shows a section of a frictional clutch assembly according to this invention.
Figure 2:
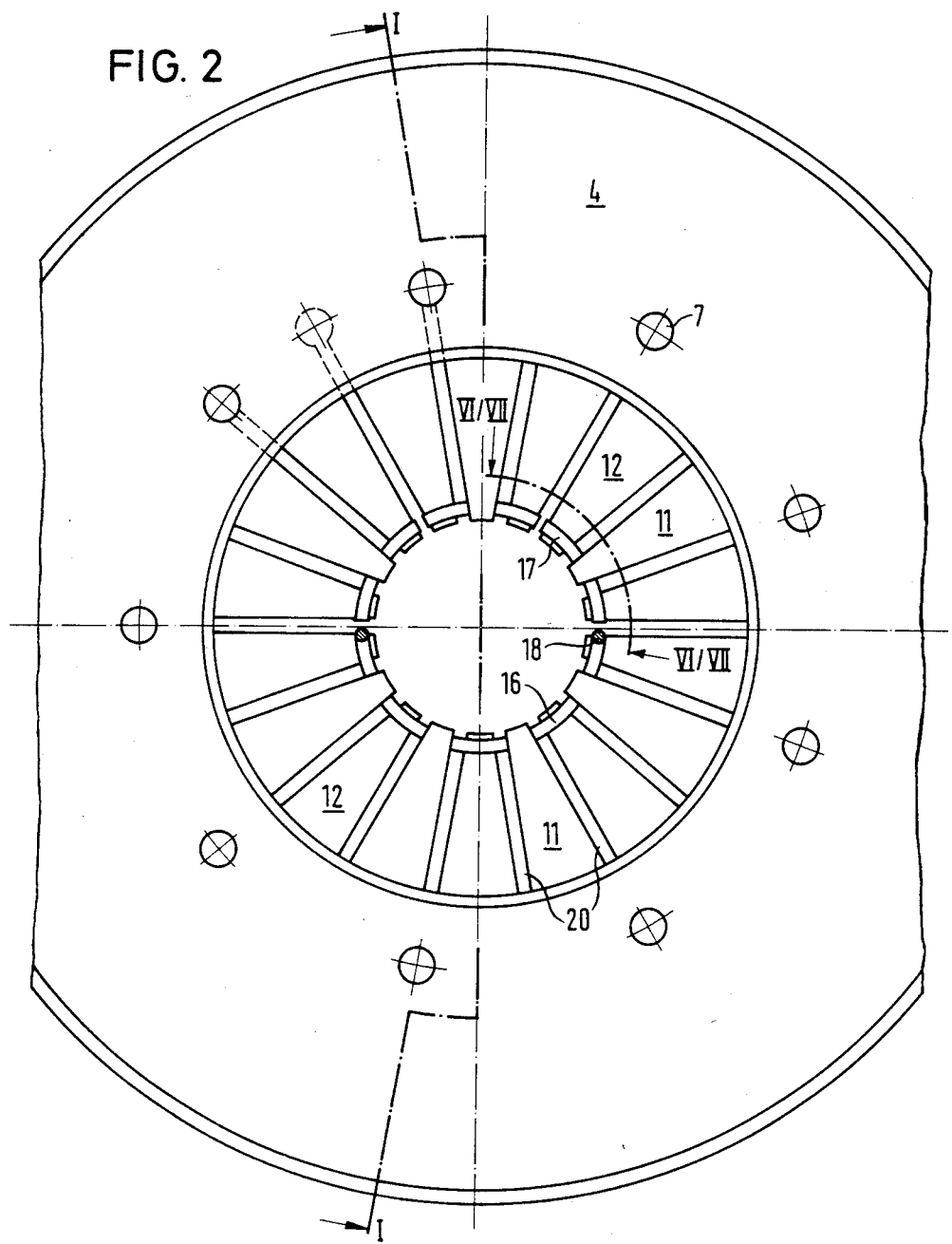
FIG. 2 shows an end view of FICG. 1 according to the arrow P of FIG. 1 with the clutch release unit being removed, the upper half of FIG. 2 illustrating a spacer assembly with a plurality of spacer segments, and the lower half of FIG. 2 showing an embodiment with a semi-circular spacer ring.

FIG. 1 shows the longitudinal section I—I in FIG. 2 through a diaphragm spring clutch of the pressed construction type. In known manner the clutch consists of a fly-wheel 5, a housing 4, a pressure plate 2 which is connected fast in rotation but axially displaceabl2y with the fly-wheel 5 or with the housing 4 and is loaded by the diaphragm spring 1 for clamping-in of a clutch disc 10, the diaphragm spring 1, in this pressed construction type, engaging with its external circumference the pressure plate 2 and being supported with a smaller circumference on the housing 4. For the purpose of support normally several support rivets 7 are arranged concentrically with the rotation axis 19 and penetrate the diaphragm spring 1 in appropriate openings while between the housing 4 and the rivet head 8 of the respective support rivet 7 two support rings 3 and 6 are arranged and the diaphragm spring 1 is arranged between these two rings. The diaphragm spring tongues 11 and 12 extend radially inwards and are in operative connection with the release bearing 9. The spring tongues 11 and 12, as may also be seen from FIG. 2, are set out alternately in relation to one another and form a gap visible in longitudinal section, in which a ring 13 is arranged. This ring 13 is preferably held by the inherent stress of the set-out spring tongues 11 and 12 and can be additionally secured, as described in greater detail hereinafter. The ring 13 is arranged concentrically with the rotation axis 19 and can have any desired cross-section.

Figure 3:
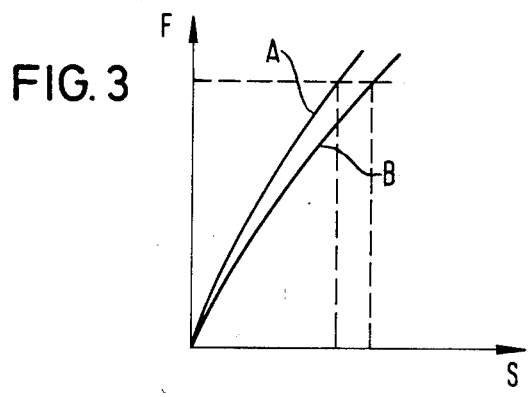
FIG. 3 shows the clutch release force applied by the clutch release unit onto the radially inner ends of the tongues in dependency of the clutch release path, both for a prior art construction and a construction of this invention.

The manner of operation of this clutch will be explained in greater detail with reference to the curves according to FIG. 3.

FIG. 1 shows the engaged condition of the clutch. In this position the pre-stressed diaphragm spring 1 bears with its external diameter on the pressure plate 2 and with a smaller diameter, through the support ring 3, on the housing 4. Thus the clutch disc 10 is clamped in with its friction linings between the fly-wheel 5 and the pressure plate 2. To disengage the clutch the release bearing 9 is loaded with a force F in the direction of the arrow P, whereby the spring tongues 11 directly and the spring tongues 12 through the spacer ring 13 are loaded and moved in the direction of the arrow P. On initiation of this disengagement or release action the supporting force of the diaphragm spring 1 acting on the clutch housing 4 through the support ring 3 is reduced and the diaphragm spring 1 comes to bear on the support ring 6. Thus the supporting force changes its direction in relation to the clutch housing 4. With the movement of the tongues 11 and 12 in the direction of the arrow P the part of the diaphragm spring 1 arranged radially outside the support rivets 7 pivots in the opposite direction and thus frees the pressure plate 2 and the clutch disc 10; the clutch is disengaged. The distance S travelled by the release bearing 9 and the radially inner ends of the spring tongues 11 and 12 during the release action is represented in dependency upon the release force F in FIG. 3. Here the curve A represents the travel-force ratio of a diaphragm spring clutch according to FIG. 1, while the curve B represents the prior art. In both cases the same clearance distance for the pressure plate 2 is assumed as basis. The travel path of the radially outer annular area of the diaphragm spring engaging the pressure plate 2 is substantially proportional to the force F exerted by the clutch release bearing 9. It can be ascertained clearly that by the use of a ring 13 arranged between the spread spring tongues 11 and 12 and by the consequent stiffening of the spring tongues a substantially shorter release travel S is necessary in order to disengage the clutch satisfactorily.

In FIG. 2 there is reproduced an elevation according to FIG. 1, showing different forms of embodiment of the rings clamped in between the diaphragm spring tongues. The elevation shows the clutch housing 4 with the support rivets 7. Furthermore, the individual spring tongues 11 and 12 may be seen in elevation. In the upper half of FIG. 2 several segments of a spacer ring 17 are shown, each ring segment being clamped in between three spring tongues in total. Here in each case one spring tongue 11 is set out to the right and two adjacently arranged spring tongues 12 are set out to the left as seen in FIG. 1.

The lower half of the illustration in FIG. 2 shows a further possible variant; here the ring segment 16 is of somewhat semi-circular configuration and is clamped in between the spring tongues 11, 12, alternating spring tongues 11, 12 engaging the spacer ring segment 16 on different sides thereof. The ends 18 of the semi-circular ring segment 16 are angled off in the axial direction to constitute a securing against rotation.

In FIGS. 4 to 7 there are illustrated possible variants of embodiment of the spring tongues and of the spacer rings.

Figure 4:
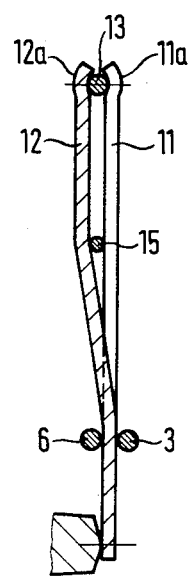
FIGS. 4 to 7 show variants of embodiment of the spring tongues and the spacer rings.

In FIG. 4, in addition to the spacer ring 13 a further spacer ring 15 is provided which extends concentrically with a larger diameter about the spacer ring 13. This additional ring 15 effects a further stiffening of the spring tongues 11 and 12. Furthermore, it can be seen from FIG. 4 that the ends of the two spring tongues 11 and 12 are angled slightly towards one another and thus fasten both spacer rings 13, 15 in radial direction. The radial securing of the spacer ring 13 is supported also by the ends of the tongues 11, 12 being curved at 11a and 12a.

Figure 5:
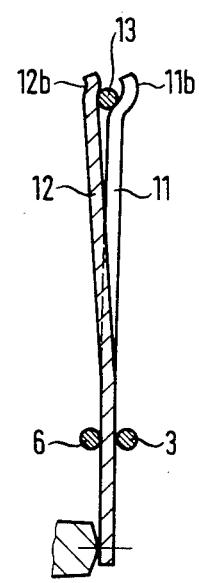

FIG. 5 shows a variant of FIG. 4 in which the spring tongues 11 and 12 are each provided with curvatures 11b and 12b, respectively, the convex side of the curvature 12b facing the concave side of the curvature 11b. In every case the shaping of the spring tongues must guarantee that a certain equalization of length is ensured along the path of movement of the spring tongues occurring on disengagement or engagement operation and a certain variation in diameter of the spacer rings 13 to 17 is admitted.

Figure 6:
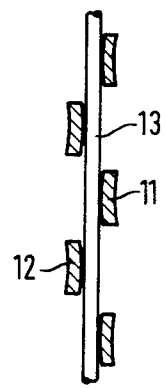

FIG. 6 shows a section VI—VI according to FIG. 2. This section is arranged concentrically with the axis of rotation and shows the shaping of the ends of the spring tongues 11 and 12 in the annular area where they rest on the spacer ring 13. In this annular area the spring tongues are domed in such a way that they rest with convex faces on the ring 13. Thus the ring is less loaded by local stress concentrations.

Figure 7:
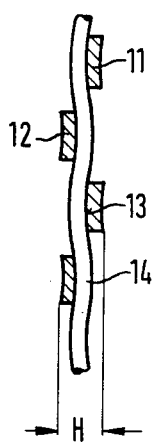

As a further variant according to FIG. 7 the additional corrugation of the spacer ring 14 is provided, whereby the spacer ring 14 has a wave-shape, the valleys of this wave-shape being adapted to the doming of the spring tongues 11 and 12. In this way a low loading of the spacer ring 14 and a securing against rotation in relation to the spring tongues are simultaneously ensured. Furthermore, a smaller overall axial height H results, compared with the previously described variants.

FIG. 8 shows the enlarged representation of the supporting area of the diaphragm spring, as shown in principle in FIG. 1. However, in FIG. 8 the slots 20 arranged between each two successive spring tongues 11 and 12 are provided with an outer diameter D which is larger than the diameter d of the support rings 3 and 6. Thus in the fitting of the rings 13, after the riveting of the support rivets 7, the possibility exists of achieving a completely play-free clamping-in of the diaphragm spring 1 between the clutch housing 4 and the rivet head 8 or, more particularly, between the support rings 3 and 6, since the insertion of the spacer ring 13 between the spring tongues 11 and 12 effects a deflection of these spring tongues up to the annular area of the support rings 3 and 6. This is an advantage over the art, because by the riveting of the support rivet 7 alone it was never possible to achieve a complete freedom from axial play in this annular area, which is desired for the operation of the friction clutch. It is immaterial here whether the support ring 3 for example is replaced by an annular bead formed out of the clutch housing 4 or whether the rivet heads 8 are replaced by tabs bent out of the clutch housing 4. In all these cases a play is inavoidable and this play can be reduced or completely avoided by the proposed spreading apart of the spring tongues 11 and 12 with the aid of a spacer ring 13.

Since in the friction clutch construction as proposed the release bearing 9 comes to abut in each case only on a part of the spring tongues, it can be advantageous to enlarge the abutment area of these spring tongues, e.g. by a T-shaped formation. Moreover, it is entirely conceivable to use the spacer rings 13 to 17 for fastening at least a part of the release bearing to the tongues or to integrate the spacer ring and a part of the release bearing.

The surprising effect of the spring tongues being stiffened by the interposed spacer ring assembly is independent of the formation of the clutch as a pressed-type or a pulled-type clutch.

While specific embodiments of the invention have been shown and described in detail to illustrate the application of the inventive principle, it will be understood that the invention may be embodied otherwise without departing from such principles. It is further to be noted that the reference numbers used in the following claims are only used for a better understanding of the claims and are by no means limitative.

What is claimed is:

1. In a frictional clutch assembly comprising a driving member (5) rotatable about an axis (19) and having a driving member engagement face,
   a clutch housing (4) fixed to said driving member (5) for common rotation therewith,
   a pressure plate (2) located axially between said driving member engagement face and said clutch housing (4), said pressure plate (2) being fixed for common rotation with said clutch housing (4), being axially movable with respect to said driving member (5) and having a pressure plate engagement face opposite to said driving member engagement face,
   a clutch disc unit (10) having a first counter engagement face for axially engaging said driving member engagement face and a second counter engagement face for axially engaging said pressure plate engagement face, for axially engaging said pressure plate engagement face, an annular diaphragm spring (1) about said axis having a radially outer edge, a radially inner edge, an annular support area about said axis supported by said clutch housing (4), an annular pressure plate engagement area about said axis acting upon said pressure plate (2) for urging said pressure plate (2) towards said driving member engagement face and an annular release unit engagement area about said axis for being engaged by a clutch release unit (9) in view of lifting said annular pressure plate engagement area from said pressure plate, said release unit engagement area being adjacent the radially inner edge of said annular diaphragm spring (1), said annular diaphragm spring (1) being provided with radially extending slots extending radially outward from said radially inner edge, said radially extending slots defining radially inwardly extending tongues (11, 12) therebetween, the improvement comprising a first group of tongues (11) being deflected relative to a second group of tongues (12) at least adjacent their respective radially inner ends, an annular spacer assembly (13) being positioned axially between said first group of tongues (11) and said second group of tongues (12), said annular spacer assembly (13) comprises a first spacer ring member (13) located adjacent said release unit engagement area, a second spacer ring member (15) is located radially outwardly of said first spacer ring member (13).

2. A frictional clutch assembly comprising a driving member (5) rotatable about an axis (19) and having a driving member engagement face, a clutch housing (4) fixed to said driving member (5) for common rotation therewith, a pressure plate (2) located axially between said driving member engagement face and said clutch housing (4), said pressure plate (2) being fixed for common rotation with said clutch housing (4), being axially movable with respect to said driving member (5) and having a pressure plate engagement face opposite to said driving member engagement face, a clutch disc unit (10) having a first counter engagement face for axially engaging said driving member engagement face and a second counter engagement face for axially engaging said pressure plate engagement face, an annular diaphragm spring (1) about said axis having a radially outer edge, a radially inner edge, an annular support area about said axis supported by said clutch housing (4), an annular pressure plate engagement area about said axis acting upon said pressure plate (2) for urging said pressure plate (2) towards said driving member engagement face and an annular release unit engagement area about said axis for being engaged by a clutch release unit (9) in view of lifting said annular pressure plate engagement area from said pressure plate, said release unit engagement area being adjacent the radially inner edge of said annular diaphragm spring (1), said annular diaphragm spring (1) being provided with radially extending slots extending radially outward from said radially inner edge, said radially extending slots defining radially inwardly extending tongues (11, 12) therebetween, the improvement comprising a first group of tongues (11) being deflected relative to a second group of tongues (12) at least adjacent their respective radially inner ends, an annular spacer assembly (13) being positioned axially between said first group of tongues (11) and said second group of tongues (12), said tongues (11, 12), when regarded in radial direction, having a cross-sectional configuration such as to engage said annular spacer assembly (13) with a convex spacer assembly engagement face.

3. A frictional clutch assembly as set forth in claim 1 or 2, wherein said annular spacer assembly (13) is fixed with respect to said tongues (11, 12) by said first group of tongues (11) and said second group of tongues (12) acting on said spacer assembly (13) with oppositely directed elastic forces.

4. A frictional clutch assembly as set forth in claim 1 or 2, wherein said annular spacer assembly comprises a plurality of spacer segments (16, 17) each extending over at least three subsequent tongues (11, 12).

5. A frictional clutch assembly as set forth in claim 1 or 2, wherein respective tongues (11) of said first group are located between two respective tongues (12) of said second group and respective tongues (12) of said second group are located between two respective tongues (11) of said first group.

6. A frictional clutch assembly as set forth in claim 1, wherein said tongues (11, 12) are provided with centering faces (11a, 12a) centering said spacer assembly (13) in radial direction.

7. A frictional clutch assembly as set forth in claim 1 or 2, wherein said spacer assembly (16) is substantially fixed with respect to said tongues (11, 12) in peripheral direction.

8. A frictional clutch assembly as set forth in claim 1 or 2, wherein said spacer assembly (14) is wave-shaped along its circumference, the tongues (12, 13) engaging respective valleys of said wave-shape.

9. A frictional clutch assembly as set forth in claim 1 or 2, wherein said annular support area is located radially between said annular pressure plate engagement area and said annular release unit engagement area, said diaphragm spring is supported in said annular support area by first support means (3, 4) on one axial side of said diaphragm spring (1) and second support means (6, 8) on the other axial side of said diaphragm spring (1), said slots (20) extend radially beyond said annular support area and said tongues (11, 12) are deflected to such an extent as to maintain said one and said other side of said diaphragm spring (1) in engagement with said first and second support means (3, 4; 6, 8).

* * * * *